United States Patent
Kwon

(10) Patent No.: US 7,174,779 B1
(45) Date of Patent: Feb. 13, 2007

(54) METHOD FOR AGING CATALYZED PARTICULATE FILTER SYSTEM

(75) Inventor: Choong-Il Kwon, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/299,368

(22) Filed: Dec. 8, 2005

(30) Foreign Application Priority Data

Nov. 8, 2005 (KR) ............ 10-2005-0106413

(51) Int. Cl.
*G01M 15/00* (2006.01)
(52) U.S. Cl. ............................................. 73/118.1
(58) Field of Classification Search ........... 73/23.31, 73/23.32, 116, 117.1, 117.2, 117.3, 118.1, 73/865.6
See application file for complete search history.

(56) References Cited

U.S. PATENT DOCUMENTS

| | | | |
|---|---|---|---|
| 6,862,927 B2 * | 3/2005 | Craig et al. ................ | 73/118.1 |
| 6,941,750 B2 * | 9/2005 | Boretto et al. .............. | 60/297 |
| 7,028,467 B2 * | 4/2006 | Kuboshima et al. .......... | 60/297 |
| 7,065,960 B2 * | 6/2006 | Gioannini et al. ........... | 60/295 |
| 2003/0059356 A1 * | 3/2003 | Hoke et al. ................ | 423/210 |
| 2003/0230076 A1 * | 12/2003 | Kwon ....................... | 60/295 |
| 2004/0226352 A1 * | 11/2004 | Craig et al. ............... | 73/118.1 |
| 2005/0279156 A1 * | 12/2005 | He et al. .................. | 73/23.31 |

* cited by examiner

*Primary Examiner*—Eric S. McCall
(74) *Attorney, Agent, or Firm*—Morgan Lewis & Bockius LLP

(57) ABSTRACT

Disclosed herein is an aging method which can support an aging test for a catalyzed diesel particulate filter system through the post-injection of fuel according to a regeneration logic for a filter, thereby remarkably reducing the time and cost necessary for developing new diesel vehicles that meet regulations relevant to exhaust gas.

4 Claims, 4 Drawing Sheets

METHOD FOR AGING CATALYZED PARTICULATE FILTER SYSTEM

CROSS-REFERENCE TO RELATED APPLICATIONS

The present application is based on, and claims priority from, Korean Application Serial Number 10-2005-0106413, filed on Nov. 8, 2005, the disclosure of which is hereby incorporated by reference herein in its entirety.

FIELD OF THE INVENTION

The present invention relates, in general, to a method for aging a catalyzed particulate filter system, and, particularly, to an aging method for a catalyzed diesel particulate filter system, by which a diesel oxidation catalyst and a catalyst-coated filter can be aged within a short time period.

BACKGROUND OF THE INVENTION

Exhaust gas from diesel engines includes a variety of harmful materials, among which nitrogen oxide emissions and particulate matter have become more severely regulated by law.

In response to the more severe regulations, a diesel exhaust filter system has been developed, which consists of a diesel oxidation catalyst (DOC) for converting hydrocarbons and carbon monoxide of diesel exhaust gas into water and carbon dioxide through catalytic oxidation, and a diesel particulate filter (DPF) for trapping particulate matter emissions from diesel exhaust gas and burning them with the heat of the exhaust gas.

Recently, a mandatory diesel engine exhaust emission requirement has became more strict (from the Euro 3 standard to the Euro 4 standard), reducing the emission allowance for nitrogen oxide and particulate matter to a half of the previous one.

In addition, this newly established Euro 4 includes an emission standard which imposes requirements on emissions from diesel vehicles which have run a distance of 100,000 km. Accordingly, new diesel vehicles, if intended to be sold, must be manufactured to meet the pertinent items of the new regulation.

As a consequence of the more severe regulation, a catalyzed diesel particulate matter filter system consisting of a diesel oxidation catalyst (DOC) and catalyzed particulate filter (CPF) is newly mounted in diesel engine vehicles.

However, when the filter of the catalyzed diesel particulate filter system is renewed, the diesel oxidation catalyst is apt to be inactivated by the heat generated upon the exothermic reaction thereon with the hydrocarbons and carbon monoxide of the exhaust gas. In this regard, the exhaust gas is measured to have a temperature from 600 to 650° C. at the outlet of the catalyst bed while ranging in temperature from 400 to 450° C., so that the exothermic reaction on the catalyst is analyzed to increase the temperature from 150 to 250° C.

Moreover, as for a catalyst-coated filter, it has carbonaceous particulate matter accumulated therein, which is combusted by the exhaust gas, having a temperature of 600° C. or higher. The combustion of the carbonaceous particulate matter increases the temperature of the filter to 800° C., often 1000° C. or higher, thereby deactivating the catalyst.

Hence, in order to mount catalyzed diesel particulate filter systems in vehicles which are manufactured to meet the new standards, a performance test must be conducted to determine whether the catalyzed diesel particulate filter systems maintain their catalytic activity even after running 100,000 km (about 100 hours). This 100,000 km durability test is a factor increasing the time and cost needed to develop catalyzed diesel particulate filter systems.

SUMMARY OF THE INVENTION

Embodiments of the present invention provide an aging method which can support an aging test for a catalyzed diesel particulate filter system through the post-injection of fuel according to regeneration logic for a filter, thereby remarkably reducing the time and cost necessary for developing new diesel vehicles that meet regulations relevant to exhaust gas.

A method for aging a catalyzed diesel particulate filter system equipped with a diesel oxidation catalyst and a catalyst-coated filter according to an embodiment of the present invention, comprising the steps of: applying to the catalyst-coated filter almost the same amount of particulate matter emissions as that which has been accumulated until the time to regenerate a filter in an actual vehicle which has been run, followed by the regeneration of the catalyst-coated filter by conducting the post-injection of fuel according to a previously set regeneration logic, determined by loads or rpm values for an engine during the operation of a vehicle and applied to the diesel vehicle, in the course of which changes in the temperature of exhaust gas and in the concentrations of oxygen, hydrocarbons and carbon monoxide of the exhaust gas, are monitored; setting a standard mode applicable for the regeneration of the filter in the catalyzed diesel particulate filter system on the basis of the data obtained with regard to the temperature distribution, oxygen concentration, and gas concentration of the exhaust gas; subjecting the diesel oxidation catalyst alone to a simulated aging test by mounting only the diesel oxidation catalyst from the catalyzed diesel particulate filter system in an experimental apparatus for an aging test, and controlling the injection time and amount of fuel for post-injection according to the same regeneration logic for filter as is set in the actual diesel vehicle; and subjecting the catalyst-coated filter alone to a simulated aging test by mounting only the catalyst-coated filter from the catalyzed diesel particulate filter system in the experimental apparatus for an aging test, and controlling the injection time and fuel amount for post-injection according to the same regeneration logic for a filter as is set in the actual diesel vehicle.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
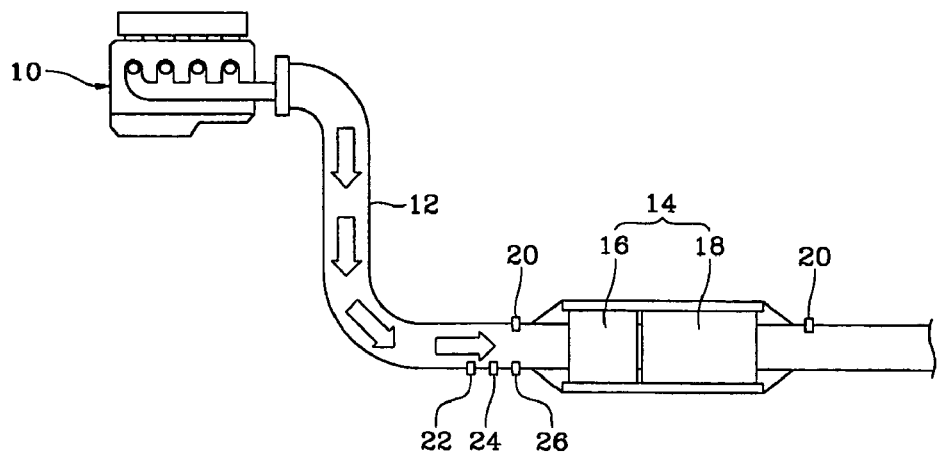
FIG. 1 is a schematic view showing an exhaust system of a diesel engine to which the present invention is applied.

Reference now should be made to the drawings, in which the same reference numerals are used throughout the different drawings to designate the same or similar components.

FIG. 1 is a structural view showing an exhaust system of a diesel engine to which the present invention is applied. The exhaust system, as shown, comprises an exhaust manifold 12 at the exhaust side of a diesel engine 10, with a catalyzed diesel particulate filter system 14 established on the exhaust manifold 12. In the catalyzed diesel particulate filter system 14, a diesel oxidation catalyst 16 is positioned in front of a catalyst-coated filter 18 in the stream of exhaust gas.

At the front and rear end of the catalyzed diesel particulate filter system 14, respective temperature sensors 20 for detecting temperatures of the flowing exhaust gas are provided. At a front end of the catalyzed diesel particulate filter system 14, a plurality of sensors 22, 24, 26 for detecting concentrations of various exhaust gas emissions, including oxygen, hydrocarbons and carbon monoxide, are also installed.

A method for determining the age of the catalyzed diesel particulate filter system 14 in accordance with the present invention is carried out through the following processes.

First, about 8–9 g of particulate matter (PM) per liter, almost the same as the amount detected when filter replacement is required in an actual diesel vehicle (corresponding to the time point at which a diesel vehicle has run about 100,000 km), is applied to the catalyst-coated filter 18. Thereafter, the post-injection of fuel is conducted according to a previously set regeneration logic, which is determined by loads or rpm values for the engine during operation and is applied to the diesel vehicle, to realize a regeneration process for the catalyst-coated filter 18, in the course of which changes in the temperature of the exhaust gas and in the concentrations of ingredients of the exhaust gas, such as oxygen, hydrocarbons and carbon monoxide, are monitored.

Figure 2:
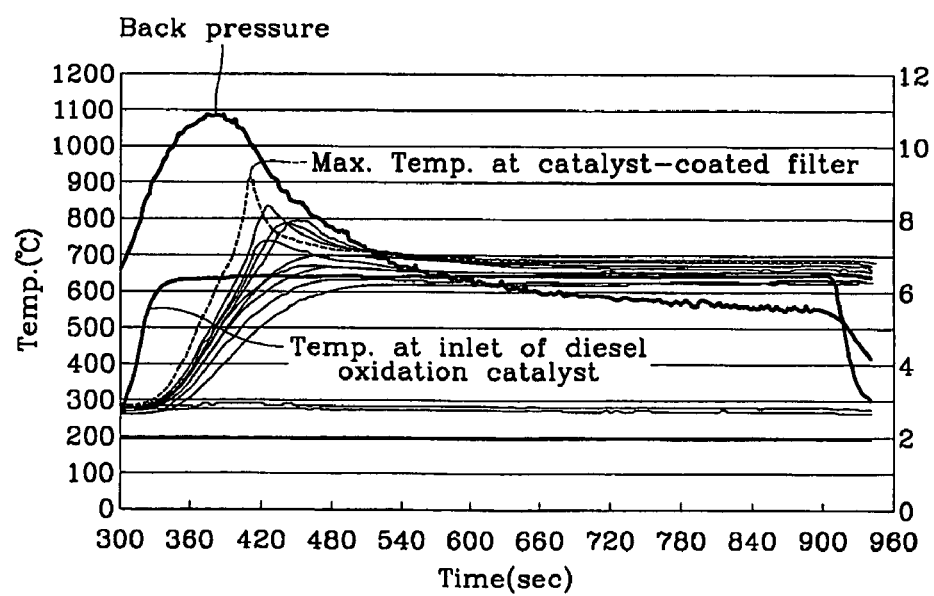
FIG. 2 is a graph showing changes in back-pressure with regard to temperature when a filter of catalyzed diesel particulate filter system is regenerated in a diesel vehicle.

At the time that a filter is renewed through the post-injection of fuel according to the previously set regeneration logic for the filter after the establishment of the catalyzed diesel particulate filter system 14 in an actual diesel vehicle, exhaust pressure changes occurring due to the pressure difference between the front end of the diesel oxidation catalyst 16 and the rear end of catalyst-coated filter 18, and changes in the temperature of the exhaust gas detected at the front end of the diesel oxidation catalyst 16, and in the temperature detected at the catalyst-coated filter (18) are shown in FIG. 2.

As can be seen, the back pressure difference is maximized at the point when filter replacement is required. At this time, the temperature of the catalyst-coated filter 18 peaks as the particulate matter is burned by the exhaust gas heated due to the excessive hydrocarbons and carbon monoxide produced upon the post-injection of fuel, whereas the inlet of the diesel oxidation catalyst 16 does not undergo a great temperature change.

Subsequently, a standard mode applicable for the renewal of a filter in an age determination test for the catalyzed diesel particulate filter system 14 is established on the basis of the data, obtained from the temperature sensor 20 and the plurality of sensors 22, 24, 26, with regard to the temperature distribution, oxygen concentration, and gas concentration of the exhaust gas.

Once a mode is set up for a series of test standards, the catalyzed diesel particulate filter system 14 is mounted in an experimental apparatus in which an aging test is performed. The experimental apparatus is operated in the same condition as in an actual diesel vehicle, and comprises a diesel engine 10, which is controlled for the time and amount of the post injection of fuel according to the same regeneration logic as is established in the actual diesel vehicle, and an exhaust system, connected to the diesel engine 10, comprising an exhaust manifold 12 on which the catalyzed diesel particulate filter system 14 is provided.

Like the actual diesel vehicle, the experimental apparatus has a temperature sensor 20 mounted both at a front end and a rear end of the catalyzed diesel particulate filter system 14, and a plurality of sensors 22, 24, 26 for detecting concentrations of oxygen, hydrocarbons and carbon monoxide, provided at a front end of the catalyzed diesel particulate filter system 14.

Figure 3:
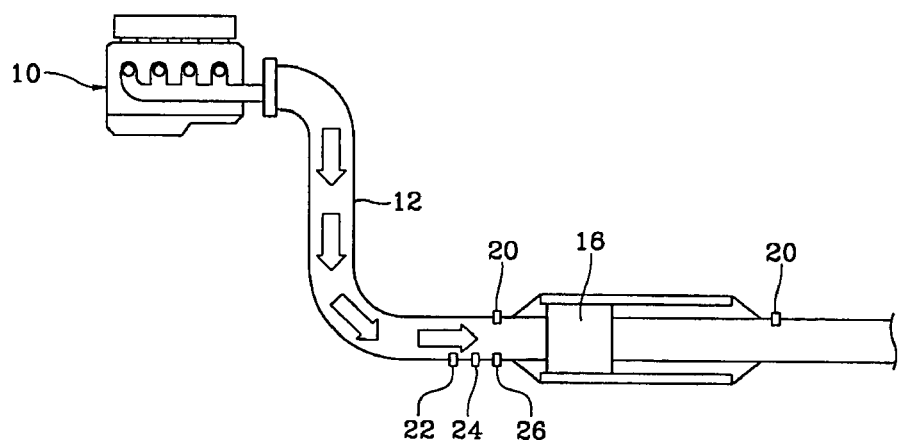
FIG. 3 is a schematic view showing an aging procedure for a diesel oxidation catalyst of the catalyzed diesel particulate filter system given in FIG. 1.

Afterwards, only a diesel oxidation catalyst 16 from a catalyzed diesel particulate filter system 14 is mounted in the experimental apparatus for an aging test, as shown in FIG. 3. By controlling the injection time and amount of fuel for post-injection according to the same regeneration logic for a filter as is set in an actual diesel vehicle, the diesel oxidation catalyst 16 alone is subjected to aging.

In the course of the aging test, changes in the temperature of the exhaust gas at the front and the rear end of the diesel oxidation catalysts 16 and in the concentration of oxygen and gas are monitored using the temperature sensors 20 and the plural sensors 22, 24, 26. On the basis of the data from the sensors, the injection time and fuel amount are controlled upon the post-injection of fuel.

Figure 4:
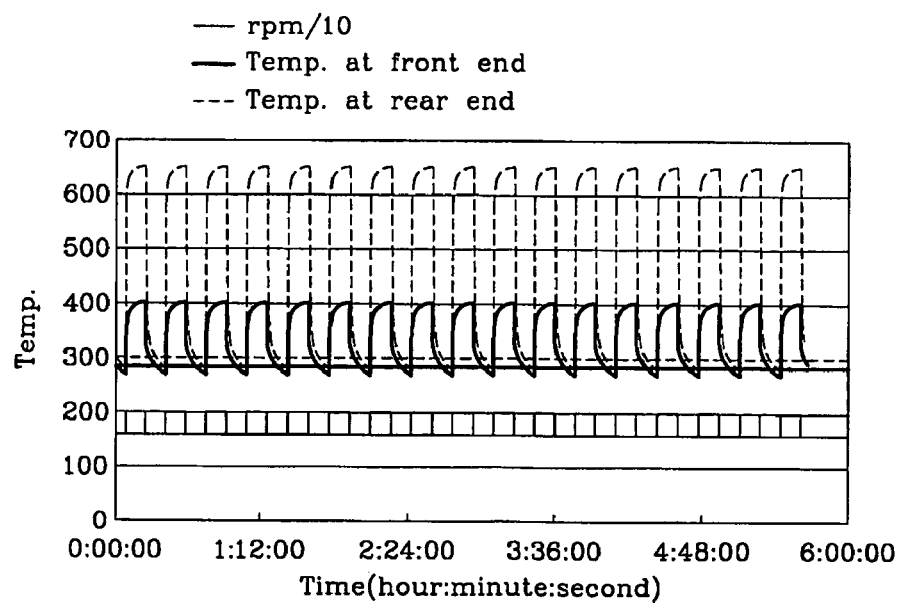
FIG. 4 is a graph showing changes in temperature when aging the diesel oxidation catalyst.

In an aging test for the diesel oxidation catalyst 16, as illustrated in FIG. 4, the post-injection of fuel for about 10 min for filter regeneration for about 10 min is repeated 200 times. Because there is a large temperature difference between the front end and the rear end of the diesel oxidation catalyst 16, the temperature for the post-injection of fuel is set on the basis of that detected at the rear end, and the time which it takes to regenerate the filter in practice is set as a time period for a cycle of the post-injection of fuel.

Changes in temperature at the front end/rear end of the diesel oxidation catalyst 16 during the aging test, as shown in FIG. 4, indicate that the exothermic reaction on the catalyst with hydrocarbons and carbon monoxide, whose amounts are increased excessively due to the post-injection of fuel, drastically increases the temperature at the rear end compared to that at the front end. These periodically and continuously increasing/decreasing changes lead to an aging effect on the diesel oxidation catalyst 16 within a short period of time.

Figure 5:
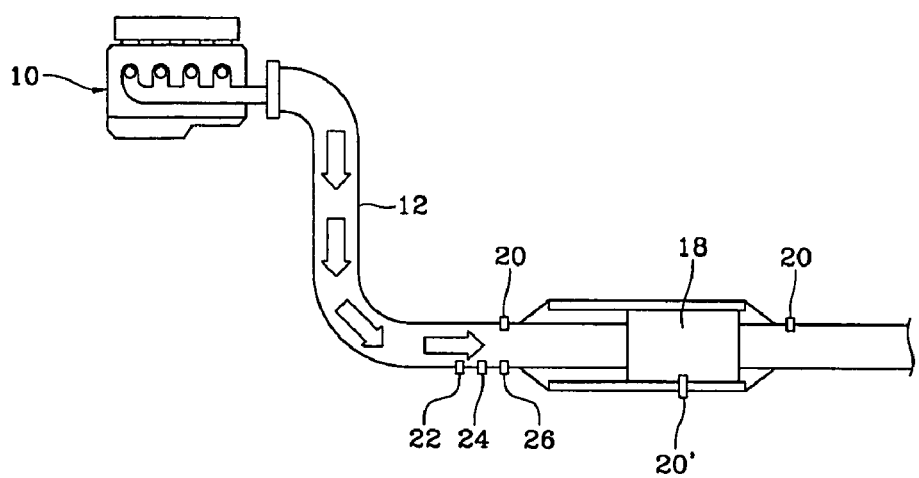
FIG. 5 is a schematic view showing an aging procedure for a catalyst-coated filter of the catalyzed diesel particulate filter system given in FIG. 1.

Separately, only a catalyst-coated filter 18 from a catalyzed diesel particulate filter system 14 is mounted in the experimental apparatus for an aging test, as shown in FIG. 5. By controlling the injection time and fuel amount for post-injection according to the previously set regeneration logic, the catalyst-coated filter 18 alone is subjected to aging.

In the course of the aging test, changes in the temperature of the exhaust gas at the front and the rear end of the catalyst-coated filter 18 and in the concentration of oxygen and gas are monitored using the temperature sensors 20 and the plural sensors 22, 24, 26. On the basis of the data from the sensors, the injection time and fuel amount are controlled upon the post-injection of fuel. In this case, it is preferable that a separate temperature sensor 20' be provided inside the filter because the highest temperatures, which are the most important factor in controlling the post-injection of fuel, are detected within the filter.

Thus, the highest temperature detected on the inside of the catalyst-coated filter 18 and the time that it takes to renew the filter in practice are set as standards for the post-injection of fuel.

Figure 6:
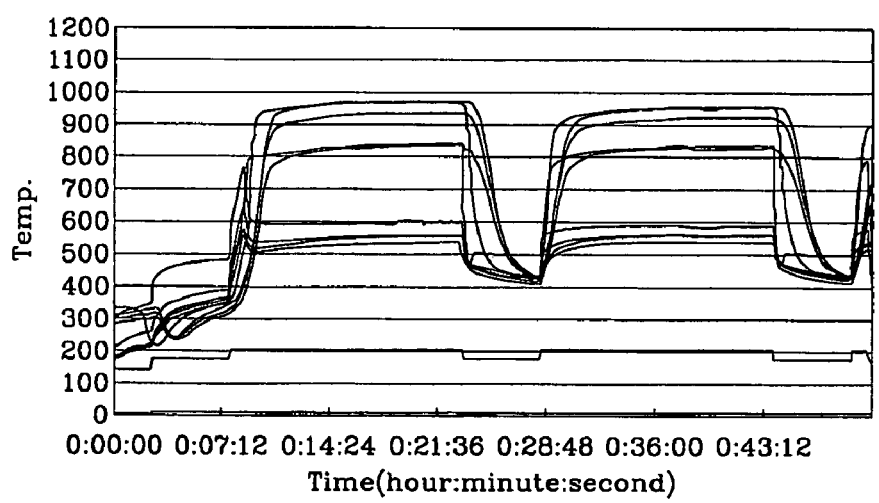
FIG. 6 is a graph showing changes in temperature when aging the catalyst-coated filter.

Changes in the temperature of the catalyst-coated filter 18 during the aging test, as shown in FIG. 6, indicate that the exothermic reaction on the catalyst with hydrocarbons and carbon monoxide, whose amounts are increased excessively due to the post-injection of fuel, increases the temperature of the exhaust gas. These periodically and continuously increasing/decreasing changes lead to an aging effect on the catalyst-coated filter 18 within a short period of time.

After undergoing the aging test, both the diesel oxidation catalyst 16 and the catalyst-coated filter 18 are mounted on an exhaust system of an actual diesel vehicle. An aging test is performed in an actual diesel vehicle while the vehicle is in motion. Investigation into the difference in the performance of the catalyzed diesel particulate filter system 14 between the simulated aging test and the actual aging test is a prerequisite for determining whether the aging method of the present invention is useful.

That is, after experiencing the simulated aging test, the diesel oxidation catalyst 16 and the catalyst-coated filter 18 are mounted in a diesel vehicle and subjected to emission testing. The data obtained during this procedure is compared to that obtained when the filter is regenerated?? after a proper amount of particulate matter has been accumulated, in practice, within the catalyzed diesel particulate filter system 14.

Figure 7:
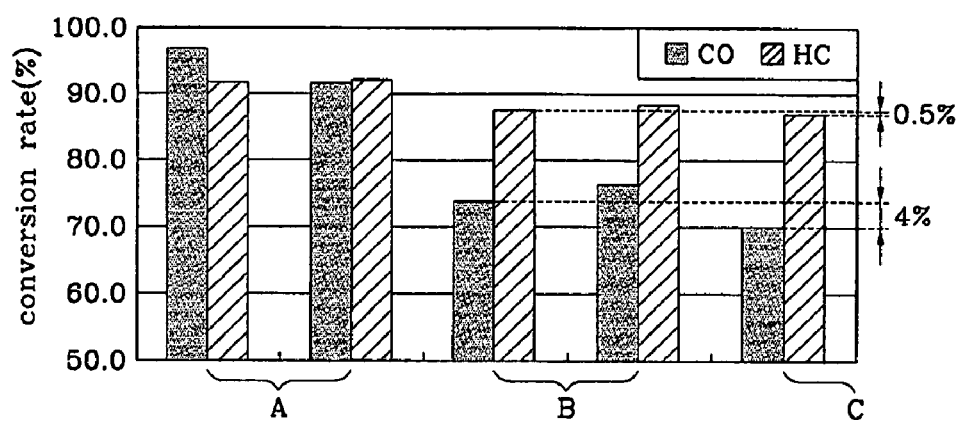
FIG. 7 is a graph in which conversion rates of hydrocarbons and carbon monoxide are compared between the aging test according to the present invention and an actual aging test in which a filter is regenerated after particulate matter is accumulated in an actual vehicle.

In FIG. 7, conversion rates of hydrocarbons and carbon monoxide are shown, with a filter not being regenerated (A), with a filter being regenerated after particulate matter has been accumulated during the actual movement of a diesel vehicle (B), and with a filter being regenerated in a diesel vehicle after it underwent the age determination test of the present invention (C).

On the basis of the conversion rates of hydrocarbons and carbon monoxide with no filter regeneration (A), the comparison of the conversion rates (B) and (C) shows that there are small gaps in the conversion rate of hydrocarbons by about 0.5% and in the conversion rate of carbon monoxide by about 4%.

Taken together, the results obtained above indicate that the age determination test for the catalyzed diesel particulate filter system 14, according to the present invention, is similar to that conducted in a diesel vehicle which has been operated in practice and thus, the aging method according to the present invention can bring about a similar result without mounting the catalyzed diesel particulate filter system 14 in an actual vehicle.

In the method for aging a catalyzed diesel particulate filter system in accordance with the present invention, as described hereinbefore, the diesel oxidation catalyst 16 and the catalyst-coated filter 18, together constituting the catalyzed diesel particulate filter system 14, are separately subjected to an aging test, thereby realizing almost the same properties with regard to the deactivation of each catalyst as in the aging test conducted in an actual vehicle which has been operated.

In addition, the present invention can significantly reduce the time that it takes to age the catalyzed diesel particulate filter system, that is, the injection time and fuel amount, upon post-injection according to the regeneration logic for a filter.

As well, the present invention can remarkably reduce the time and cost necessary for developing catalyzed diesel particulate filter systems which are applicable for the development of new diesel vehicles that meet relevant regulations.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for aging a catalyzed diesel particulate filter system equipped with a diesel oxidation catalyst and a catalyst-coated filter, comprising the steps of;

applying to the catalyst-coated filter almost the same amount of particulate matter emissions as that which has been accumulated until the time to regenerate a filter in an actual vehicle which has been run, followed by the regeneration of the catalyst-coated filter by conducting the post-injection of fuel according to a previously set regeneration logic, determined by loads or rpm values for an engine during the operation of a vehicle and applied to the diesel vehicle, in the course of which changes in the temperature of exhaust gas and in the concentrations of oxygen, hydrocarbons, and carbon monoxide of the exhaust gas, are monitored;

setting a standard mode applicable for the regeneration of the filter in the catalyzed diesel particulate filter system on the basis of the data obtained with regard to the temperature distribution, oxygen concentration, and gas concentration of the exhaust gas;

subjecting the diesel oxidation catalyst alone to a simulated aging test by mounting only a diesel oxidation catalyst from the catalyzed diesel particulate filter system in an experimental apparatus for an aging test, and controlling the injection time and amount of fuel for post-injection according to the same regeneration logic for a filter set in an actual diesel vehicle; and subjecting the catalyst-coated filter alone to a simulated aging test by mounting only a catalyst-coated filter from the catalyzed diesel particulate filter system in the experimental apparatus for an aging test, and controlling the injection time and fuel amount for post-injection according to the same regeneration logic for a filter set in an actual diesel vehicle.

2. The method as defined in claim 1, wherein a temperature detected at a rear end of the diesel oxidation catalyst and a time for which it takes to regenerate the filter in practice are set as a temperature standard and a time period of a cycle, respectively, for the post-injection of fuel during the aging of the diesel oxidation catalyst alone.

3. The method as defined in claim 1, wherein a temperature detected on an inside of the catalyst-coated filter, and a time which it takes to regenerate the filter in practice are set as a temperature standard and a time period of a cycle, respectively, for the post-injection of fuel during the aging of the catalyst-coated filter.

4. The method as defined in claim 1, further comprising, investigating a difference in performance of the catalyzed diesel particulate filter system between the simulated aging test and an actual aging test by mounting both the diesel oxidation catalyst and the catalyst-coated filter in a diesel vehicle, applying an emission test to the diesel oxidation catalyst and the catalyst-coated filter during the actual operation of the diesel vehicle, and comparing conversion rates of hydrocarbons and carbon monoxide between the simulated aging test and the actual aging test.

* * * * *